United States Patent
Aoki

(10) Patent No.: US 8,814,206 B2
(45) Date of Patent: Aug. 26, 2014

(54) VEHICLE INSTRUMENT PANEL REINFORCEMENT AND PASSENGER SEAT AIRBAG DEVICE ATTACHMENT STRUCTURE EMPLOYING THE VEHICLE INSTRUMENT PANEL REINFORCEMENT

(75) Inventor: Takayuki Aoki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/004,943

(22) PCT Filed: Mar. 28, 2011

(86) PCT No.: PCT/JP2011/057722
§ 371 (c)(1),
(2), (4) Date: Sep. 13, 2013

(87) PCT Pub. No.: WO2012/131886
PCT Pub. Date: Oct. 4, 2012

(65) Prior Publication Data
US 2014/0021707 A1 Jan. 23, 2014

(51) Int. Cl.
*B60R 21/205* (2011.01)
*B62D 25/14* (2006.01)
*B62D 21/15* (2006.01)

(52) U.S. Cl.
CPC ............ *B60R 21/205* (2013.01); *B62D 25/145* (2013.01); *B62D 21/15* (2013.01)
USPC ........................................ 280/732; 280/728.2

(58) Field of Classification Search
CPC .... B62D 25/14; B62D 25/145; B60R 21/205; B60R 21/045

USPC ............................................... 280/728.2, 732
See application file for complete search history.

(56) References Cited

U.S. PATENT DOCUMENTS

| | | | |
|---|---|---|---|
| 5,687,989 A * | 11/1997 | Maesing et al. ........... 280/728.2 |
| 6,276,739 B1 | 8/2001 | Wich |
| 6,523,878 B2 * | 2/2003 | Scheidel .......................... 296/70 |
| 7,350,805 B2 * | 4/2008 | Kumagai ....................... 280/731 |
| 7,393,004 B2 * | 7/2008 | Ono et al. ................... 280/728.2 |
| 8,313,134 B2 * | 11/2012 | Wenzel et al. ................... 296/70 |
| 2003/0085555 A1 * | 5/2003 | Segura ........................ 280/728.3 |
| 2010/0090451 A1 * | 4/2010 | Atsumi et al. ................ 280/779 |
| 2010/0140912 A1 * | 6/2010 | Zornack et al. ............... 280/779 |
| 2013/0076016 A1 * | 3/2013 | Aoki ............................. 280/779 |
| 2014/0001792 A1 * | 1/2014 | Aoki et al. ............... 296/193.09 |

FOREIGN PATENT DOCUMENTS

| | | |
|---|---|---|
| JP | U 61-175083 | 10/1986 |
| JP | A 5-238421 | 9/1993 |

(Continued)

*Primary Examiner* — James English
(74) *Attorney, Agent, or Firm* — Oliff PLC

(57) ABSTRACT

Vehicle instrument panel reinforcement and a passenger seat airbag device attachment structure employing the vehicle instrument panel reinforcement are provided that are capable of securing the strength and rigidity to support for example a reaction force imparted during deployment of a passenger seat airbag device, and are also capable of achieving a reduction in both cost and weight. Instrument panel reinforcement formed with a quadrilateral shaped closed cross-section profile from an upper member and a lower member is disposed along the vehicle width direction inside a vehicle instrument panel. A circular cylinder shaped collar is disposed inside a closed cross-section portion of the upper member. A passenger seat airbag device is fastened and fixed to the instrument panel reinforcement by a bolt and weld nut, employing the collar.

6 Claims, 8 Drawing Sheets

(56) References Cited

FOREIGN PATENT DOCUMENTS

| JP | A 2000-153777 | 6/2000 |
| JP | A 2001-527483 | 12/2001 |
| JP | A 2003-34266 | 2/2003 |
| JP | A 2004-338479 | 12/2004 |
| JP | A 2006-143156 | 6/2006 |
| JP | A 2008-155812 | 7/2008 |
| JP | A 2008-265693 | 11/2008 |
| WO | WO 2011/155031 A1 | 12/2011 |

* cited by examiner

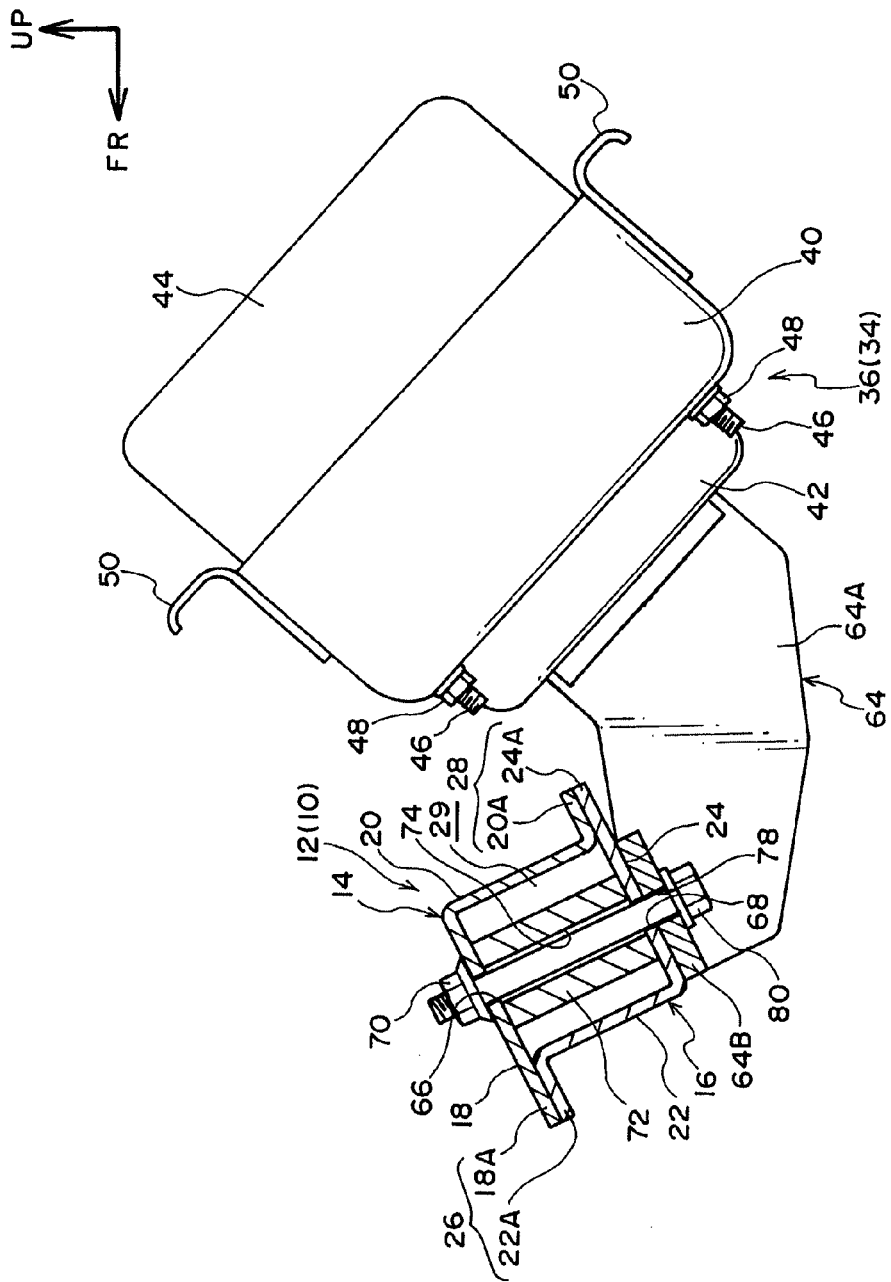

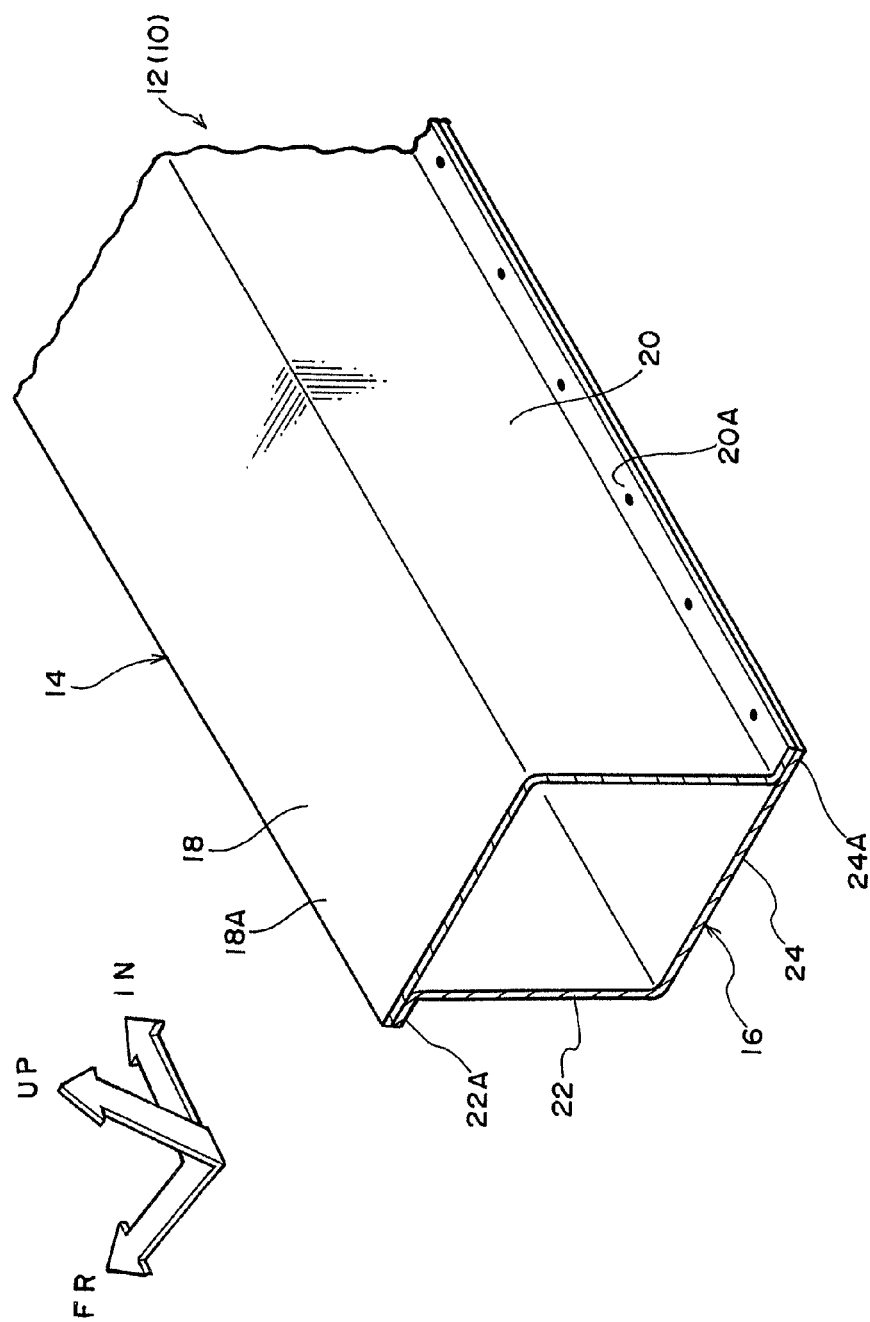

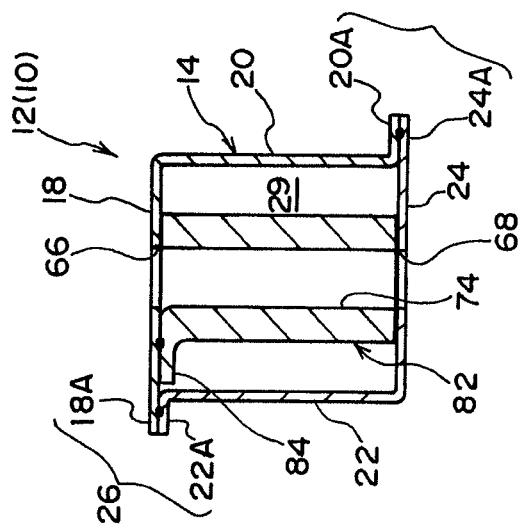
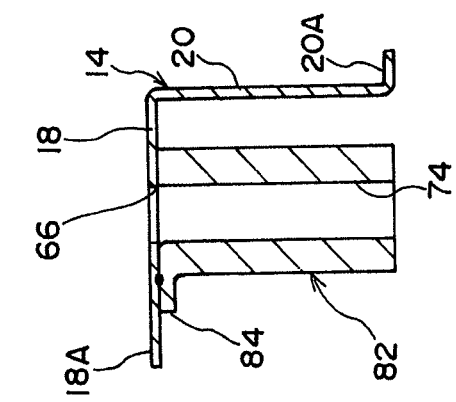
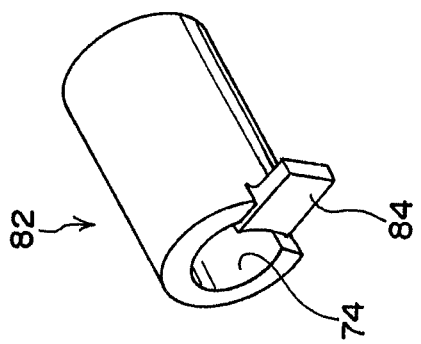

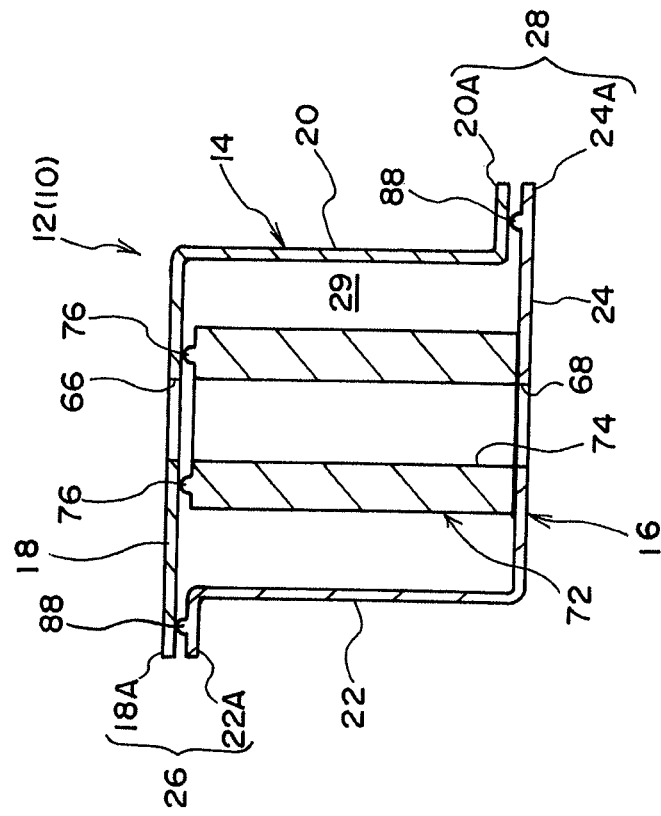
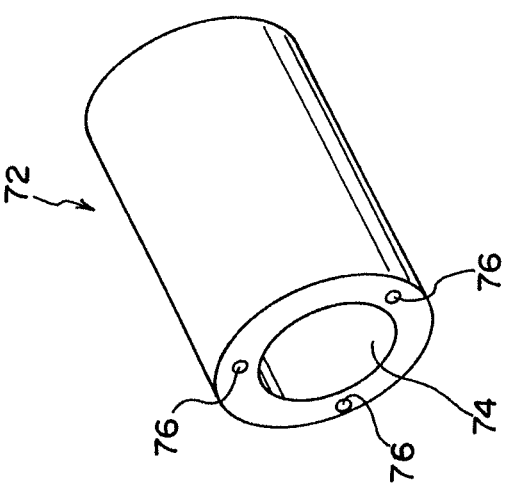

VEHICLE INSTRUMENT PANEL REINFORCEMENT AND PASSENGER SEAT AIRBAG DEVICE ATTACHMENT STRUCTURE EMPLOYING THE VEHICLE INSTRUMENT PANEL REINFORCEMENT

TECHNICAL FIELD

The present invention relates to a vehicle instrument panel reinforcement and a passenger seat airbag device attachment structure employing the vehicle instrument panel reinforcement.

BACKGROUND ART

Patent Document 1 (Japanese Patent Application Laid-Open (JP-A) No. 2003-034266) describes instrument panel reinforcement formed by extrusion forming. A cross shaped internal rib is formed inside the instrument panel reinforcement. An opening portion is formed to an outer peripheral face of the instrument panel reinforcement facing a space that is partitioned by the internal rib. A wire harness is housed inside one space portion through the opening portion. A passenger seat airbag device is directly fixed to the outer peripheral face through a bracket.

In Patent Document 2 (JP-A No. 2006-143156), instrument panel reinforcement is configured by a driving seat side cross-beam and a passenger seat side cross-beam. The driving seat side cross-beam and passenger seat side cross-beam are respectively configured with top-bottom divided two-part structures. The respective parts are formed by press forming. The passenger seat side cross-beam is integrally formed with an attachment bracket of a passenger seat airbag device.
Patent Document 1: JP-A No. 2003-034266
Patent Document 2: JP-A No. 2006-143156

DISCLOSURE OF INVENTION

Technical Problem

However, in the conventional technology described in Patent Document 1, an aluminum material is employed due to manufacturing the instrument panel reinforcement by extrusion forming. As well as increasing the cost of the instrument panel reinforcement, there are also issues with inferior strength and rigidity in comparison to instrument panel reinforcement manufactured employing other materials, for example steel plates. Moreover, in the case of the conventional technology, the passenger seat airbag device is fastened to the surface of an outer peripheral portion of the instrument panel reinforcement, thereby requiring a degree of surface strength. There is accordingly a need to increase the plate thickness of the instrument panel reinforcement in order to secure surface strength.

In the conventional technology described in Patent Document 2, configuration is made wherein the bracket for attaching the passenger seat airbag device to the passenger seat side cross-beam is integrally formed during press forming of the passenger side cross-beam. There is accordingly a need to increase the plate thickness in order to secure sufficient rigidity to withstand a reaction force imparted during deployment of the passenger seat airbag device. There are accordingly the issues of an increase in cost and an increase in weight of the instrument panel reinforcement. The conventional technology described above accordingly leaves room for improvement.

In consideration of the above circumstances, an object of the present invention is to obtain vehicle instrument panel reinforcement and a passenger seat airbag device attachment structure employing the vehicle instrument panel reinforcement that are capable of securing the strength and rigidity to support a load such as a reaction force imparted during deployment of the passenger seat airbag device, and that are also capable of achieving a reduction in weight and cost.

Solution to Problem

Vehicle instrument panel reinforcement according to a first aspect includes: an instrument panel reinforcement main body that is disposed along a vehicle width direction inside a vehicle instrument panel, that is configured with a quadrilateral shaped closed cross-section profile by welding together two members formed by press forming, and that is formed with a pair of coaxially positioned bolt insertion through holes in two opposing faces of the quadrilateral shape; and a collar that is disposed inside the closed cross-section of the instrument panel reinforcement main body such that a hole formed at an axial center portion of the collar is positioned coaxially to the pair of bolt insertion through holes, with one axial direction end portion of the collar being joined to one face out of the two opposing faces.

Vehicle instrument panel reinforcement according to a second aspect is the first aspect, wherein: one axial direction end portion of the collar is joined to one of the two members of the instrument panel reinforcement main body using projection welding or spot welding; and the two members are joined together using spot welding or arc welding or laser welding.

Vehicle instrument panel reinforcement according to a third aspect is the first aspect, wherein: one axial direction end portion of the collar is joined to one of the two members of the instrument panel reinforcement main body using projection welding; and the two members are joined together using projection welding.

In a passenger seat airbag device attachment structure employing the vehicle instrument panel reinforcement according to a fourth aspect: the passenger seat airbag device is disposed at a passenger seat side of a vehicle instrument panel and includes a bracket for attachment to a vehicle body; and the bracket is directly fixed to the instrument panel reinforcement main body by fastening the bracket through the collar, which is provided in advance inside the closed cross-section of the instrument panel reinforcement main body provided to the vehicle instrument panel reinforcement of any one of claim 1 to claim 3.

A passenger seat airbag device attachment structure employing the vehicle instrument panel reinforcement according to a fifth aspect is the fourth aspect, wherein: the passenger seat airbag device is a mid-mount type passenger seat airbag device disposed at a vehicle rear side of the instrument panel reinforcement.

According to the first aspect, the instrument panel reinforcement main body is disposed along a vehicle width direction inside the vehicle instrument panel. The instrument panel reinforcement main body is configured with a quadrilateral shaped closed cross-section profile by welding together the two members formed by press forming, and the pair of coaxially positioned bolt insertion through holes are formed in the two opposing faces of the quadrilateral shape.

Moreover in the present aspect, the collar is disposed inside the closed cross-section of the instrument panel reinforcement main body such that the hole formed at the axial center portion of the collar is positioned coaxially with the pair of bolt insertion through holes of the instrument panel reinforcement main body. In this state, the one axial direction end portion of the collar is joined to the one face out of the two opposing faces. It is accordingly possible to fasten and fix for example a passenger seat airbag device attachment bracket through the collar. By fixing the bracket to the instrument panel reinforcement main body through the collar, a structure is achieved in which the collar spans between the two opposing faces of the instrument panel reinforcement main body. The strength and rigidity of the instrument panel reinforcement main body itself are accordingly increased, and cross-sectional collapse and buckling of the instrument panel reinforcement main body do not readily occur when a large load is input, such as a deployment reaction force when the passenger seat airbag device is actuated as in the example above.

According to the present aspect, the strength and rigidity of the instrument panel reinforcement main body can be increased in comparison to when an instrument panel reinforcement main body is manufactured employing an aluminum material, whilst also being cheaper. When making an instrument panel reinforcement main body out of an aluminum material, there is a need to increase the plate thickness in order to secure surface strength, however in the present aspect, a sufficient reinforcement effect can be obtained by disposing the collar inside the hollow closed cross-section and fastening and fixing with a bolt. A reduction in weight can thus be achieved for the instrument panel reinforcement main body.

According to the second aspect, the one axial direction end portion of the collar is joined to the one of the two members of the instrument panel reinforcement main body using projection welding or spot welding. Moreover, the two members of the instrument panel reinforcement main body are joined together using spot welding or arc welding or laser welding. Accordingly, the two members can be closed off by spot welding or arc welding or laser welding after temporarily fixing the collar to the one of the two members in advance by projection welding or spot welding. The condition of the weld of the collar can accordingly be visually checked when the collar has been pre-attached to the one of the two members.

According to the third aspect, the one axial direction end portion of the collar is joined to the one of the two members of the instrument panel reinforcement main body using projection welding. Moreover, the two members of the instrument panel reinforcement main body are joined together using projection welding. Accordingly, all three of the one member, the other member and the collar can be welded together at the same time (in one go).

According to the fourth aspect, the passenger seat airbag device that includes the bracket for attachment to the vehicle body is disposed at a passenger seat side of the vehicle instrument panel. The bracket is directly fastened and fixed to the instrument panel reinforcement main body through the collar that is provided in advance inside the closed cross-section of the instrument panel reinforcement main body. The strength and rigidity of the instrument panel reinforcement main body itself are increased as a result, enabling the deployment reaction force when the passenger seat airbag device is actuated to be adequately supported. There is moreover no need increase the plate thickness in order to reinforce the instrument panel reinforcement main body, enabling a reduction in both weight and cost to be achieved.

According to the fifth aspect, the passenger seat airbag device is a mid-mount type and is disposed at a vehicle rear side of the instrument panel reinforcement main body. The passenger seat airbag device can therefore be moved in substantially horizontally from the vehicle rear side of the instrument panel reinforcement main body and the bracket can be brought to the position where the collar is disposed.

Advantageous Effects of Invention

As described above, the vehicle instrument panel reinforcement of the first aspect exhibits the excellent advantageous effects of enabling the strength and rigidity required to support a load such as a reaction force imparted during deployment of the passenger seat airbag device to be secured, and of enabling a reduction in both weight and cost.

The vehicle instrument panel reinforcement of the second aspect exhibits the excellent advantageous effect of enabling the state of the joint of the collar to be visually checked due to pre-attaching the collar to the one member, and hence enabling good weld quality to be secured for the collar.

The vehicle instrument panel reinforcement of the third aspect exhibits the excellent advantageous effect of shortening the welding process, and hence enabling a reduction in costs and an increase in productivity to be achieved.

The passenger seat airbag device attachment structure employing the vehicle instrument panel reinforcement of the fourth aspect exhibits the excellent advantageous effects of enabling the strength and rigidity required in order to support a reaction force imparted during deployment of the passenger seat airbag device to be secured, and also of enabling a reduction in both cost and weight.

The passenger seat airbag device attachment structure employing the vehicle instrument panel reinforcement of the fifth aspect exhibits the excellent advantageous effect of enabling the vehicle installation characteristics of the passenger seat airbag device to be enhanced.

BRIEF DESCRIPTION OF DRAWINGS

FIG. 2 is an enlarged vertical cross-section of relevant portions, with the passenger seat airbag device attachment structure illustrated in FIG. 1 shown enlarged.

FIG. 3 is an enlarged perspective view with a portion of the instrument panel reinforcement illustrated in FIG. 1 shown enlarged.

FIG. 7A is a perspective view illustrating a modified example of the collar illustrated in FIG. 4A.

FIG. 7B is a vertical cross-section illustrating a pre-attached state of the collar illustrated in FIG. 7A to an upper member.

FIG. 7C is a vertical cross-section illustrating a state in which a lower member has been joined to the state illustrated in FIG. 7B.

FIG. 8A is a perspective view illustrating a collar employed in vehicle instrument panel reinforcement and a passenger seat airbag device attachment structure employing the vehicle instrument panel reinforcement according to a second exemplary embodiment.

FIG. 8B is a vertical cross-section illustrating a state in which a lower member has been joined to the state illustrated in FIG. 8A.

BEST MODE FOR CARRYING OUT THE INVENTION

First Exemplary Embodiment

Figure 1:
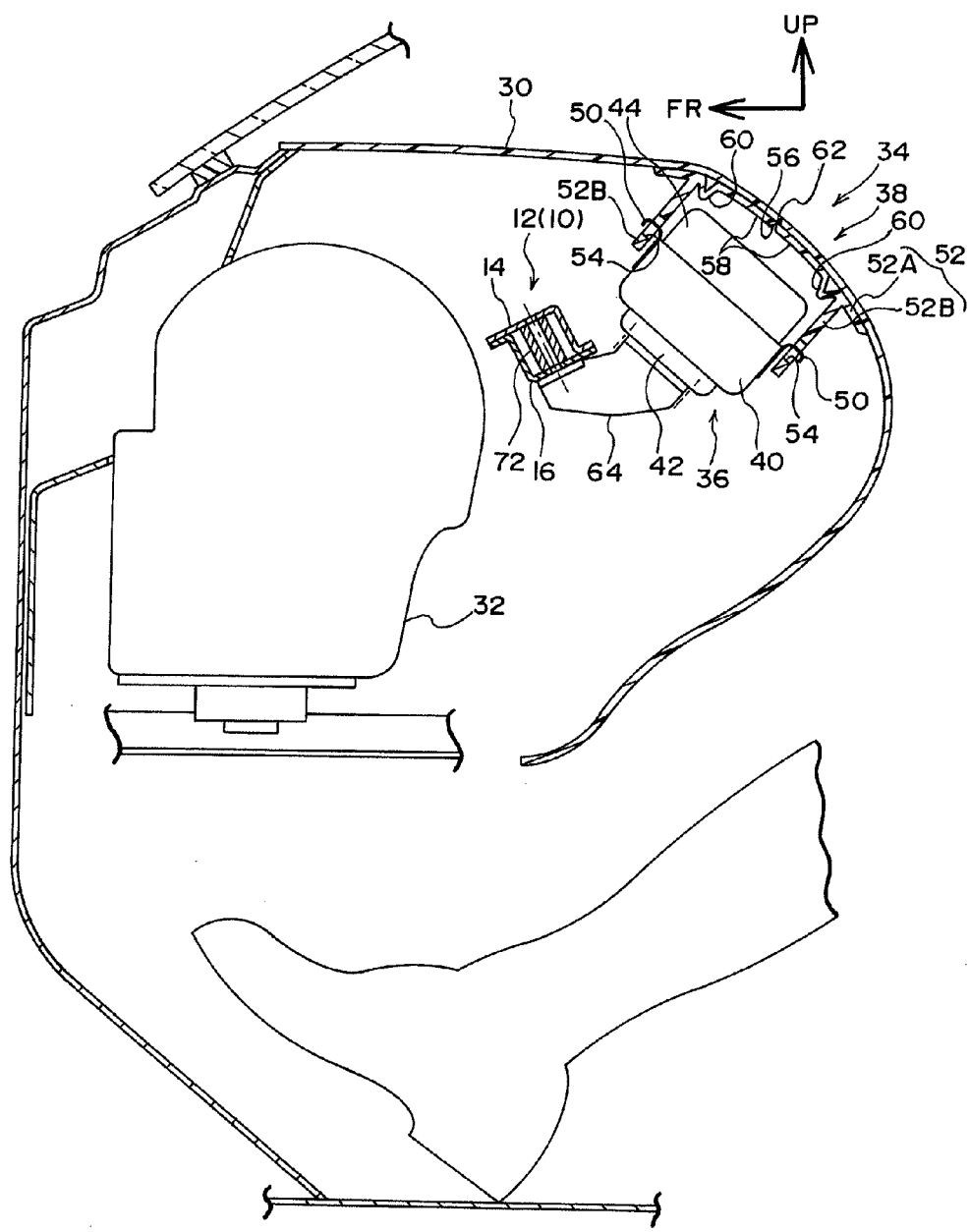
FIG. 1 is a vertical cross-section illustrating a vehicle instrument panel reinforcement and a passenger seat airbag device attachment structure employing the vehicle instrument panel reinforcement according to a first exemplary embodiment.

Explanation follows regarding a first exemplary embodiment of vehicle instrument panel reinforcement and a passenger seat airbag device attachment structure employing the instrument panel reinforcement according to the present invention, with reference to FIG. 1 to FIG. 7. Note that in the drawings, the arrow FR indicates the vehicle front side, the arrow UP indicates the vehicle upper side, and the arrow IN indicates the vehicle width direction inside as appropriate.

Detailed Structure of Instrument Panel Reinforcement 10

Explanation is first given regarding the structure of instrument panel reinforcement 10. As illustrated in FIG. 1 to FIG. 3, the instrument panel reinforcement 10 is configured by a pressed structural body 12 of quadrilateral shaped cross-section profile that is divided into two components along one diagonal. Note that the pressed structural body 12 corresponds to an "instrument panel reinforcement main body" of the present invention. Specifically, the pressed structural body 12 is configured by two respectively press-formed components formed with substantially L-shaped cross-section profiles, namely an upper member 14 serving as one member, and a lower member 16 serving as the other member.

The upper member 14 configures an upper portion side of the quadrilateral shaped cross-section and includes an upper face portion 18 disposed substantially facing the vehicle front side, and a rear face portion 20 disposed substantially facing the vehicle lower side. The lower member 16 configures a lower portion side of the quadrilateral shaped cross-section and includes a front face portion 22 disposed substantially facing the vehicle upper side, and a lower face portion 24 disposed substantially facing the vehicle rear side.

An upper edge portion of the front face portion 22 is bent around at a right angle substantially towards the vehicle front side in a front face portion 22 plane orthogonal direction, thereby configuring a lower side front aligned flange portion 22A. The lower side front aligned flange portion 22A is up-down aligned superimposed with an upper side front aligned flange portion 18A that is a front edge portion of the upper face portion 18 of the upper member 14. The lower side front aligned flange portion 22A and the upper side front aligned flange portion 18A are joined together by spot welding in this state (below, when there is no need to distinguish between the lower side front aligned flange portion 22A and the upper side front aligned flange portion 18A, this is referred to as the "front aligned flange portion 26").

A lower edge portion of the rear face portion 20 of the upper member 14 is bent around at a right angle substantially towards the vehicle rear side in a rear face portion 20 plane orthogonal direction, thereby configuring an upper side rear aligned flange portion 20A. The upper side rear aligned flange portion 20A is up-down aligned superimposed with a lower side rear aligned flange portion 24A that is a rear edge portion of the lower face portion 24 of the lower member 16. The upper side rear aligned flange portion 20A and the lower side rear aligned flange portion 24A are joined together by spot welding in this state (below, when there is no need to distinguish between the lower side rear aligned flange portion 24A and the upper side rear aligned flange portion 20A, this is referred to as the "rear aligned flange portion 28"). The pressed structural body 12 is thus configured to include a closed cross-section portion 29 inside the quadrilateral shaped (square shaped) cross-section profile.

Attachment brackets, not illustrated in the drawings, are attached at both length direction ends of the instrument panel reinforcement 10 described above. The instrument panel reinforcement 10 is fastened and fixed to a pair of left and right front pillars through these attachment brackets. The instrument panel reinforcement 10 thereby spans between the pair of left and right front pillars.

Passenger Seat Airbag Device 34 Configuration

As illustrated in FIG. 1, a resin instrument panel 30 serving as a vehicle interior decorative member is attached to the instrument panel reinforcement 10. Inside the instrument panel 30 on the passenger seat side, an HVAC (Heating and Ventilating Air Conditioning) 32 is installed to the vehicle front side of the instrument panel reinforcement 10 and a passenger seat airbag device 34 is installed to the vehicle rear side of the instrument panel reinforcement 10. The passenger seat airbag device 34 is of what is referred to as a mid-mount type, and is disposed to the vehicle rear side of the instrument panel reinforcement 10.

More specifically, the passenger seat airbag device 34 is configured by an airbag module 36 in which functional components are housed, and an airbag door 38 that covers the airbag module 36. As illustrated enlarged in FIG. 2, the airbag module 36 includes a metal box shaped module case 40 disposed so as to have an open side on the vehicle rear side. Inside the module case 40 are housed an inflator 42 that is actuated and generates a large quantity of gas in event of a frontal collision or in event of a frontal collision being predicted, and a passenger seat airbag 44 that is housed in a folded up state inside the module case 40 and that inflates and deploys due to the gas ejected from the inflator 42. The inflator 42 and the passenger seat airbag 44 are fixed (commonly fastened) to a bottom portion of the module case 40 by screwing nuts 48 onto stud bolts 46 that penetrate the bottom portion of the module case 40 from the inside. Note that a squib (ignition device) is disposed at an axial center portion of the inflator 42. The inflator 42 is actuated by an airbag ECU, not illustrated in the drawings, passing a specific current through the squib.

Metal hooks 50 for attaching the airbag door are integrally provided at a specific separation to each other on front and rear side walls of the module case 40. As illustrated in FIG. 1, the airbag door 38 is provided with a resin airbag door retainer 52. The airbag door retainer 52 is configured including a base portion 52A disposed at a back face of the instrument panel 30, and a pair of front and rear leg portions 52B extending from an inner peripheral side of the base portion 52A towards the instrument panel reinforcement 10 side. The pair of front and rear leg portions 52B are respectively formed with anchor holes 54, and the hooks 50 are anchored in the anchor holes 54. A central portion of the base portion 52A is formed with a rupture portion 56 that is formed in an H shape as viewed from the side of an occupant seated in the passenger seat. A pair of front and rear door portions 58 are thereby formed to the base portion 52A of the airbag door retainer 52. Hinge portions 60 of V shaped cross-section profile are integrally formed to upper and lower edges of the pair of front and rear door portions 58. A rupture portion 62 that is formed in an H shape as viewed from the side of an occupant seated in the passenger seat is moreover formed at a back face of the passenger seat side of the instrument panel 30. Note that in reality the rupture portion 62 cannot be seen by an occupant seated in the passenger seat. This type of passenger seat airbag device 34 is also referred to as an "invisible type passenger seat airbag device".

A metal bracket 64 for attaching the passenger seat airbag device 34 to the vehicle body side is attached to the bottom portion of the module case 40. As illustrated in FIG. 2, the bracket 64 is formed in a U shape in plan view, and includes a pair of left and right arm portions 64A that extend parallel to the vehicle front-rear direction, and a coupling portion 64B that couples together front end portions of the pair of left and right arm portions 64A along the vehicle width direction. Base end portions (rear end portions) of the pair of left and right arm portions 64A are bent towards directions heading away from each other in the vehicle width direction, and are for example welded or fastened to the module case 40. An upper face of the coupling portion 64B is inclined so as to make face-to-face contact with a lower face of the lower face portion 24 of the lower member 16 of the instrument panel reinforcement 10.

Attachment Structure of Passenger Seat Airbag Device 34 to Instrument Panel Reinforcement 10

A pair of bolt insertion through holes 66, 68 are coaxially formed to the upper face portion 18 of the upper member 14 and the lower face portion 24 of the lower member 16 that are two opposing faces of the instrument panel reinforcement 10. A weld nut 70 is welded in advance to the upper face of the upper face portion 18 of the upper member 14 so as to be coaxial to the bolt insertion through hole 66.

Figure 4C:
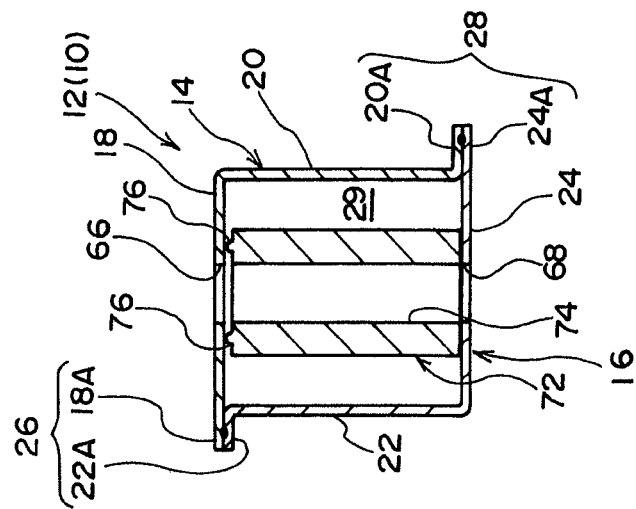
FIG. 4C is a vertical cross-section illustrating a state in which a lower member has been joined to the state illustrated in FIG. 4B.
Figure 4B:
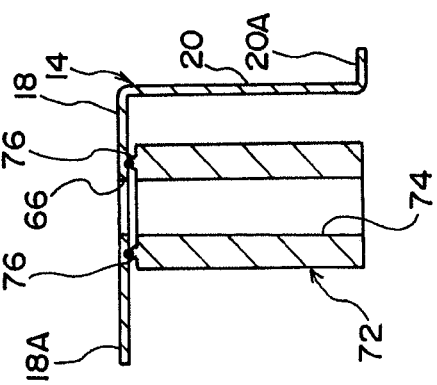
FIG. 4B is a vertical cross-section illustrating a pre-attached state of the collar illustrated in FIG. 4A to an upper member.
Figure 4A:
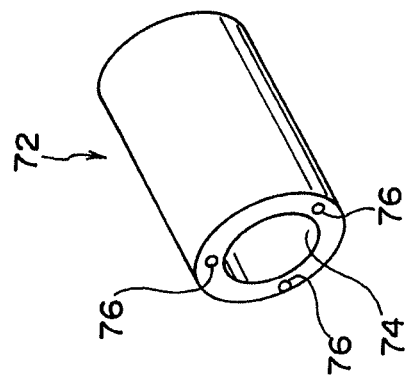
FIG. 4A is a perspective view illustrating the collar illustrated in FIG. 1.

A collar 72 is disposed inside the closed cross-section portion 29 of the instrument panel reinforcement 10. The collar 72 is configured as a circular cylinder shaped member and is made from metal. As illustrated in FIG. 4A to FIG. 4C, an axial direction dimension of the collar 72 is set as a dimension that can be housed inside the closed cross-section portion 29, and is slightly shorter that the separation distance between the opposing faces of the upper face portion 18 and the lower face portion 24. A bolt insertion hole 74 is moreover formed at an axial center portion of the collar 72. The internal diameter of the bolt insertion hole 74 is set slightly larger than the internal diameter of the pair of bolt insertion through holes 66, 68 formed on the instrument panel reinforcement 10 sides.

One axial direction end portion of the collar 72 is integrally formed with plural (3 in total) projection portions 76 at a specific intervals (at 120 degree intervals in the present exemplary embodiment) around the circumferential direction. However it is sufficient that plural of the projection portions 76 are provided, and for example 2 projection portions 76 may be provided at 180 degree intervals, or 4 projection portions 76 may be provided at 90 degree intervals instead of providing 3 projection portions 76. As illustrated in FIG. 4B, the collar 72 is brought into contact with and projection welded in advance to a back face of the upper face portion 18 of the upper member 14, prior to joining together the upper member 14 and the lower member 16. As illustrated in FIG. 4C, the upper member 14 and the lower member 16 are then superimposed and aligned with each other whilst performing positioning such that the bolt insertion through hole 66 foamed in the upper member 14 side is coaxial to the bolt insertion hole 74 of the collar 72 and the bolt insertion through hole 68 formed in the lower member 16 side, and the front aligned flange portion 26 and the rear aligned flange portion 28 are respectively welded together by spot welding. An axial direction other end of the collar 72 is therefore not joined on the lower member 16 side (is in an unfixed state). Note that the collar 72 may be attached either to the upper member 14 side or to the lower member 16 side.

A bolt insertion through hole 78 formed to the coupling portion 64B of the bracket 64 of the passenger seat airbag device 34 is aligned with the position where the bolt insertion through hole 68 of the lower member 16 of the instrument panel reinforcement 10 is formed, and as illustrated in FIG. 2, a bolt 80 is passed from a rear side of the coupling portion 64B to inside the bolt insertion hole 74 of the collar 72 and screwed into the weld nut 70 that has been welded in advance to the upper member 14. The passenger seat airbag device 34 is thereby attached to the instrument panel reinforcement 10.

Operation and Advantageous Effects of the Present Exemplary Embodiment

Explanation follows regarding operation and advantageous effects of the present exemplary embodiment.

According to the present exemplary embodiment, the instrument panel reinforcement 10 employs the two members of the upper member 14 and the lower member 16 that are formed by press forming to configure a quadrilateral shaped closed cross-section profile. In the present exemplary embodiment, one axial direction end portion of the circular cylinder shaped collar 72 is fixed to the upper member 14 using projection welding, after which the upper member 14 and the lower member 16 are spot welded together to close off the cross-section. The bracket 64 of the passenger seat airbag device 34 is made to contact the lower face portion 24 of the lower member 16 whilst being positioned, and the bolt 80 is inserted into the bolt insertion hole 74 at the axial center portion of the collar 72 and screwed into the weld nut 70, thereby fastening and fixing the passenger seat airbag device 34 directly to the instrument panel reinforcement 10. In this state, a structure is achieved in which the collar 72 spans between the two opposing faces (the upper face portion 18 of the upper member 14 and the lower face portion 24 of the lower member 16) of the instrument panel reinforcement 10. The strength and rigidity of the instrument panel reinforcement 10 itself are accordingly increased, and cross-sectional collapse and buckling of the instrument panel reinforcement 10 do not readily occur in the event that a large load is input, such as a deployment reaction force when the passenger seat airbag device 34 is actuated.

According to the present exemplary embodiment, the strength and rigidity of the instrument panel reinforcement 10 can be raised, and the instrument panel reinforcement 10 can be manufactured at lower cost, than when employing an aluminum material in the manufacture of instrument panel reinforcement. Moreover, there is a need to increase the plate thickness in order to secure surface strength when instrument panel reinforcement is manufactured from an aluminum material. In the present exemplary embodiment however, sufficient reinforcement effect is obtained by disposing the collar 72 inside the hollow closed cross-section portion 29, enabling a reduction in weight of the instrument panel reinforcement 10 to be achieved. As a result, in the present exemplary embodiment the strength and rigidity needed in order to support the reaction force imparted during deployment of the passenger seat airbag device 34 can be secured, whilst cost and weight can also be reduced.

According to the present exemplary embodiment, the one axial direction end portion of the collar 72 is joined in advance to the upper face portion 18 of the upper member 14 of the instrument panel reinforcement 10 using projection welding. The condition of the weld of the collar 72 can therefore be visually checked prior to closing off the cross-section of the upper member 14 and the lower member 16 using spot welding. Good weld quality can accordingly be secured for the collar 72.

Figure 5:
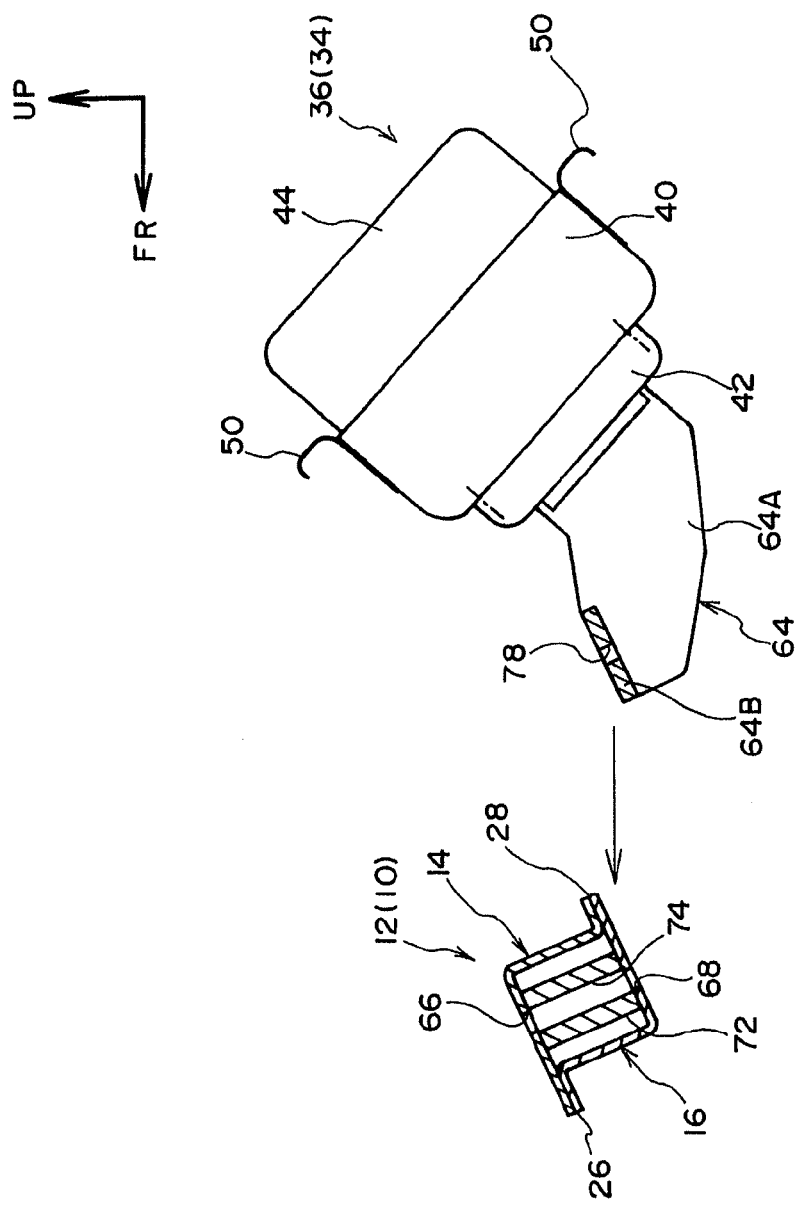
FIG. 5 is an explanatory drawing to explain one advantageous effect obtained by the first exemplary embodiment.

In the present exemplary embodiment, the passenger seat airbag device 34 is configured by a mid-mount type passenger seat airbag device disposed to the vehicle rear side of the instrument panel reinforcement 10. As illustrated in FIG. 5, the passenger seat airbag device 34 can be moved in substantially horizontally from the vehicle rear side of the instrument panel reinforcement 10 and the bracket 64 can be brought to the position where the collar 72 is disposed. The vehicle installation characteristics of the passenger seat airbag device 34 can accordingly be enhanced.

Figure 6A:
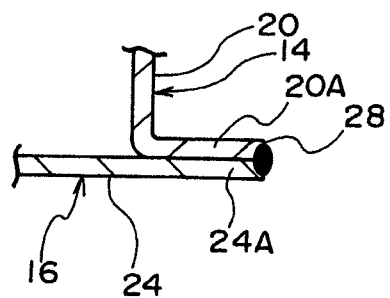
FIG. 6A is an enlarged partial cross-section illustrating a modified example of a method of joining together an upper member and a lower member.
Figure 6B:
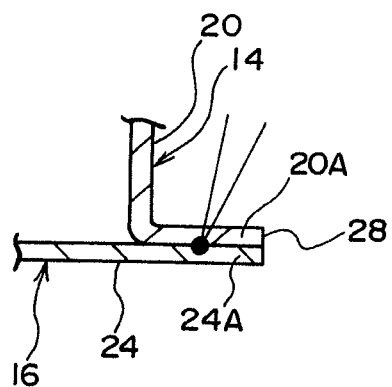
FIG. 6B is an enlarged partial cross-section illustrating another modified example of a method of joining together an upper member and a lower member.

Note that in the above exemplary embodiment, the upper member 14 and the lower member 16 are spot welded together, however there is no limitation thereto, and the two may be joined together employing another welding method. For example, as illustrated in FIG. 6A, the front aligned flange portion 26 (omitted from illustration in FIG. 6A) and the rear aligned flange portion 28 of the upper member 14 and the lower member 16 may be arc welded together. Alternatively, as illustrated in FIG. 6B, the front aligned flange portion 26 (omitted from illustration in FIG. 6B) and the rear aligned flange portion 28 of the upper member 14 and the lower member 16 may be laser welded together.

In the above exemplary embodiment, the one axial direction end portion of the circular cylinder shaped collar 72 is formed with the plural projection portions 76 and projection welded, however there is no limitation thereto, and a collar 82, illustrated in FIG. 7A, may be employed. The collar 82 is a collar configured by a rectangular member that is bent into a circular cylinder shape after forming a small projection portion 84 bent out at a right angle from a long edge side in advance by press forming. As illustrated in FIG. 7B, the collar 82 is set against the upper member 14, and the collar 82 is pre-attached to the upper member 14 by spot welding the small projection portion 84. Then, as illustrated in FIG. 7C, the lower member 16 is spot welded to the upper member 14, thereby configuring the pressed structural body 12, namely configuring the instrument panel reinforcement 10. When such a configuration is adopted, there is the advantage that joining the collar 82 to the upper member 14 and joining the upper member 14 and the lower member together can all be performed by spot welding.

Second Exemplary Embodiment

Explanation follows regarding vehicle instrument panel reinforcement and a passenger seat airbag device attachment structure employing the instrument panel reinforcement of a second exemplary embodiment of the present invention, with reference to FIG. 8A and FIG. 8B. Note that similar configuration portions to the first exemplary embodiment are allocated the same reference numerals, and explanation thereof is omitted.

As illustrated in FIG. 8A and FIG. 8B, the second exemplary embodiment is characterized in that not only is the collar 72 projection welded to the upper member 14, but projection welding is also performed at the joints between the upper member 14 and the lower member 16. Plural projection portions 88 are accordingly formed at specific intervals on upper faces of the lower member 16 corresponding to the lower side front aligned flange portion 22A and the lower side rear aligned flange portion 24A respectively.

As illustrated in FIG. 8B, in such a configuration the collar 72 is disposed between the upper member 14 and the lower member 16. The collar 72 is positioned with respect to the upper member 14 and the lower member 16 such that the bolt insertion through hole 66 formed in the upper face portion 18 of the upper member 14, the bolt insertion hole 74 of the collar 72, and the bolt insertion through hole 68 formed in the lower face portion 24 of the lower member 16 are disposed coaxially to each other. At the same time, the projection portions 88 of the lower side front aligned flange portion 22A of the lower member 16 are made to contact the lower face of the upper side front aligned flange portion 18A of the upper member 14, and the projection portions 88 of the lower side rear aligned flange portion 24A of the lower member 16 are made to contact the lower face of the upper side rear aligned flange portion 20A of the upper member 14. The collar 72 and the upper face portion 18 of the upper member 14 are then projection welded together, and the upper member 14 and the lower member 16 are projection welded together at several points at the same time.

Such a configuration enables all three of the upper member 14, the lower member 16 and the collar 72 to be welded together at the same time (in one go). The welding process can accordingly be shortened, thereby enabling a reduction in costs and an increase in productivity as a result.

Supplementary Explanation of the Above Exemplary Embodiments

In the exemplary embodiments described above, the instrument panel reinforcement 10 is configured by disposing the upper member 14 that has an L shaped cross-section profile as taken along a direction orthogonal to the length direction at an upper portion of the quadrilateral shaped cross-section, and disposing the lower member 16 that similarly has a substantially L shaped cross-section profile at a lower portion of the quadrilateral shaped cross-section. There is however no limitation thereto, and although the merit would be reduced, other cross-sectional structures may also be adopted. For example, the front-rear positional relationship of the upper member 14 and the lower member 16 may be reversed. Moreover, a cross-section profile may be adopted wherein an upper member is formed with a U shaped cross-section that is open downwards, and a flat plate shaped lower member closes of an open side end portion of the upper member (a quadrilateral shaped cross-section profile that is not divided into two parts along one diagonal).

The exemplary embodiment described above employ the bracket 64 that is formed with a U shape in plan view, however there is no limitation thereto, and configuration may be made using a bracket that is left-right divided into two components. In such cases, a pair of left and right collars 72 are provided inside the closed cross-section portion 29 of the instrument panel reinforcement 10.

The invention claimed is:

1. A passenger seat airbag device attachment structure employing a vehicle instrument panel reinforcement, the structure comprising:

an instrument panel reinforcement main body that is disposed along a vehicle width direction inside a vehicle instrument panel, that is configured with a quadrilateral shaped closed cross-section profile by welding together two members formed by press forming, and that is formed with a pair of coaxially positioned bolt insertion through holes in two opposing faces of the quadrilateral shape; and a collar that is disposed inside the closed cross-section of the instrument panel reinforcement main body such that a hole formed at an axial center portion of the collar is positioned coaxially with the pair of bolt insertion through holes, with one axial direction end portion of the collar being joined to one face out of the two opposing faces, wherein the passenger seat airbag device is disposed at a passenger seat side of the vehicle instrument panel; and a bracket provided at the passenger seat airbag device for attachment to the vehicle instrument panel reinforcement is directly fixed to the instrument panel reinforcement main body by fastening the bracket through the collar, which is provided in advance inside the closed cross-section of the instrument panel reinforcement main body.

2. The passenger seat airbag device attachment structure employing the vehicle instrument panel reinforcement of claim 1, wherein:

one axial direction end portion of the collar is joined to one of the two members of the instrument panel reinforcement main body using projection welding or spot welding; and the two members are joined together using spot welding or arc welding or laser welding.

3. The passenger seat airbag device attachment structure employing the vehicle instrument panel reinforcement of claim 1, wherein:

one axial direction end portion of the collar is joined to one of the two members of the instrument panel reinforcement main body using projection welding; and the two members are joined together using projection welding.

4. The passenger seat airbag device attachment structure employing the vehicle instrument panel reinforcement of claim 1, wherein:

the passenger seat airbag device is a mid-mount type passenger seat airbag device disposed at a vehicle rear side of the instrument panel reinforcement.

5. The passenger seat airbag device attachment structure employing the vehicle instrument panel reinforcement of claim 2, wherein:

the passenger seat airbag device is a mid-mount type passenger seat airbag device disposed at a vehicle rear side of the instrument panel reinforcement.

6. The passenger seat airbag device attachment structure employing the vehicle instrument panel reinforcement of claim 3, wherein:

the passenger seat airbag device is a mid-mount type passenger seat airbag device disposed at a vehicle rear side of the instrument panel reinforcement.

\* \* \* \* \*